United States Patent [19]

Sakata et al.

[11] 4,206,237
[45] Jun. 3, 1980

[54] METHOD OF COOLING BEER WITHIN A FERMENTATION TANK

[75] Inventors: Yuzo Sakata, Matsudo; Osamu Murakami, Machida, both of Japan

[73] Assignee: Asahi Breweries Ltd., Tokyo, Japan

[21] Appl. No.: 41,798

[22] Filed: May 23, 1979

Related U.S. Application Data

[63] Continuation-in-part of Ser. No. 863,132, Dec. 22, 1977, abandoned.

[30] Foreign Application Priority Data

Aug. 15, 1977 [JP] Japan .................. 52-97065

[51] Int. Cl.² .................. A23L 3/36; C12C 9/06
[52] U.S. Cl. .................. 426/16; 99/276; 99/277; 165/143; 165/145; 165/169; 165/170; 426/524
[58] Field of Search .................. 426/11, 16, 592, 524; 99/275, 276, 277, 277.1; 165/169, 145, 170, 143; 62/394, 396

[56] References Cited

U.S. PATENT DOCUMENTS

| | | | |
|---|---|---|---|
| 418,872 | 1/1890 | Kuhn .................. | 426/524 X |
| 1,941,329 | 12/1933 | Trudel .................. | 165/169 X |
| 2,034,468 | 3/1936 | Heuser .................. | 426/16 |
| 2,200,426 | 5/1940 | Lehman .................. | 165/170 |
| 2,277,526 | 3/1942 | Mojonnier et al. .................. | 165/169 X |
| 2,343,717 | 3/1944 | Turnau .................. | 165/169 X |
| 2,391,876 | 1/1946 | Brown .................. | 165/169 X |
| 2,744,391 | 5/1956 | Deane .................. | 165/169 X |
| 3,867,551 | 2/1975 | Jaegle .................. | 426/16 |
| 3,871,446 | 3/1975 | Langenberg .................. | 165/169 X |

FOREIGN PATENT DOCUMENTS

| | | | |
|---|---|---|---|
| 450922 | 8/1948 | Canada .................. | 165/169 |
| 567443 | 1/1933 | Fed. Rep. of Germany .................. | 165/169 |
| 826624 | 1/1960 | United Kingdom .................. | 165/169 |

*Primary Examiner*—Arthur L. Corbin
*Attorney, Agent, or Firm*—Blanchard, Flynn, Thiel, Boutell & Tanis

[57] ABSTRACT

A method of cooling beer, wherein beer contained in a cylindrical fermentation tank of a large capacity and undergoing a fermentation process extending from the beginning of fermentation to the termination of fermentation, is cooled by employing cooling jackets mounted on the external wall surface of the sidewall of the tank and on the bottom of the tank and wherein cooling is more intense at the lower layer of beer in the tank.

2 Claims, 5 Drawing Figures

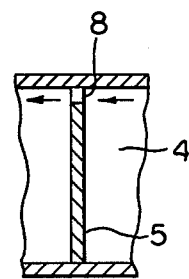
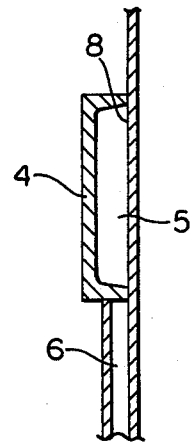
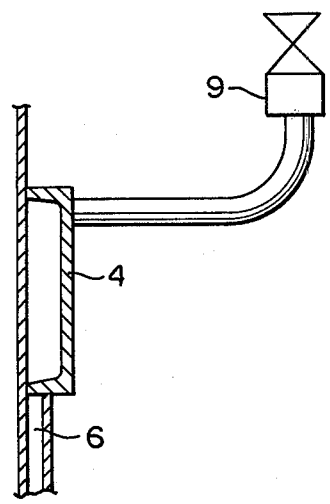

METHOD OF COOLING BEER WITHIN A FERMENTATION TANK

CROSS-REFERENCE TO RELATED APPLICATION

This is a continuation-in-part of Ser. No. 863,132, filed Dec. 22, 1977, now abandoned.

BACKGROUND OF THE INVENTION

This invention relates to a method of cooling beer in a fermentation tank having a large volume.

Techniques for effecting the main fermentation and the secondary fermentation (lagering) of beer by the use of separate cylindrical tanks or one cylindrical tank, of large capacity, installed out-of-doors, have recently been developed. Examples thereof are disclosed in U.S. Pat. Nos. 3,374,726 and 3,433,148. The term "fermentation tank" referred to in the present description is a general term for identifying tanks devised to effect the main fermentation and the secondary fermentation (lagering) successively within one tank and tanks devised to effect the main fermentation and the secondary fermentation (lagering) in separate tanks. The term "a tank of a large capacity" herein means a tank having a volumetric capacity of more than 200 Kl, generally 500 to 600 Kl, and a height of 10 m or more, and such large capacity tanks are to be distinguished from conventional fermentation tanks or lagering tanks which have a capacity of from 10 Kl to scores of Kl and a height of generally no more than about 3 m. The present invention relates to an improved method of cooling beer within a large volumetric capacity fermentation tank such as defined above.

During the main fermentation of beer, in the initial and middle stages thereof wherein fermentation is effected while maintaining the liquid temperature at 8° to 10° C., the liquid is intensely agitated by heat convection and the carbon dioxide gas bubbles generated by the fermentation and, therefore, the cooling of the liquid is performed efficiently. But, in the final stage of the fermentation, and particularly in the case where the same fermentation tank is used for lagering the beer, it is necessary for the beer to be cooled down to about 0° C., and it is also necessary in the course of lagering for aging the beer to maintain the beer at a temperature of 5° C. to −1° C. (the freezing temperature of beer is about −2° C.). Further, because beer is about 92 to 93 wt. % water, the properties of water, particularly the density of water being highest at about 4° C., are important factors. Therefore, in the case of the conventional method of cooling beer in a cylindrical fermentation tank having a volumetric capacity as large as 500 Kl, e.g., a method of cooling beer by introducing a coolant into a coolant coil inside the tank, because no convection of beer occurs and the cooling relies on heat transfer alone, without agitation, there occurs the physical phenomenon that the temperature of the beer in the lower part of the fermentation tank stays at about 4° C. or thereabout and it does not appreciably change. Moreover, if the beer is cooled down to below 4° C., there occurs the peculiar phenomenon that the cooled portion of the beer rises in the tank.

SUMMARY OF THE INVENTION

The object of the present invention is to provide a method which provides more efficient cooling of beer contained in a fermentation tank.

The method of the present invention is characterized by the feature that beer contained in a cylindrical fermentation tank of a large volumetric capacity and undergoing a fermentation process extending from the beginning of fermentation to the termination of fermentation, is cooled by subjecting the beer in the lower portion of the tank to a more intensive cooling than the beer in the upper portion of the tank. As specific apparatus for thus cooling the beer, there is provided a two-stage cooling jacket consisting of upper and lower jacket members which are interconnected at their ends, and the two-stage cooling jacket is mounted on the external periphery of the sidewall of the fermentation tank. A stream of fluid coolant is fed into the lower jacket member and thence into the upper jacket member in order to cool the beer. Moreover, another cooling jacket is additionally provided underneath the bottom wall of the fermentation tank, and a stream of fluid coolant is flowed through this jacket too so as to cool the beer in the bottom portion of the tank.

BRIEF DESCRIPTION OF THE DRAWINGS

In the appended drawings:

FIG. 3 is a cross-sectional view of a fragment of the upper header of the cooling jacket;

FIG. 4 is a cross-sectional view of a fragment of the body jacket; and

FIG. 5 is a view illustrating the manner in which the air trapping pipe (air escape) is mounted on the body jacket.

DESCRIPTION OF THE PREFERRED EMBODIMENT

Figure 1:
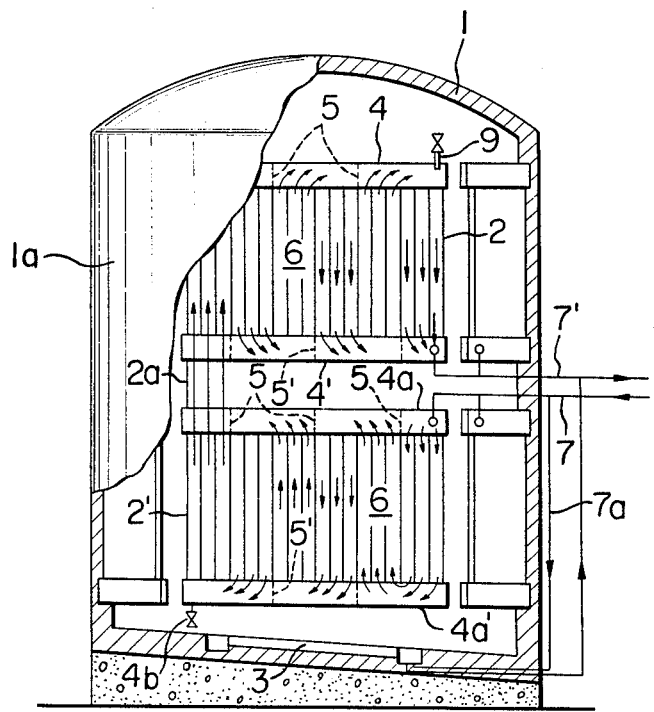
FIG. 1 is a schematic front view, partly in section, of a fermentation tank for use in the present invention.
Figure 2:
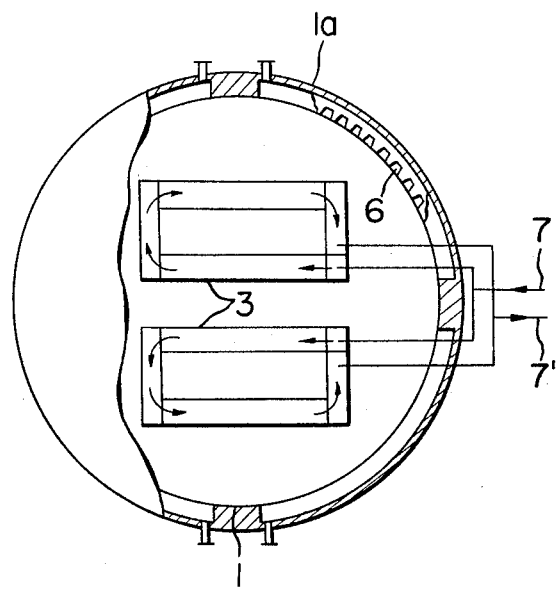
FIG. 2 is a schematic plan view, partly in section, of the fermentation tank and illustrating the mounting of the bottom cooling jacket on the fermentation tank.

Referring to FIG. 1 and FIG. 2, the reference numeral 1 denotes a cylindrical fermentation tank of a large volumetric capacity which is covered with a layer of insulating material 1a consisting of polyurethane foam. A vertical cooling jacket which is divided into upper and lower jacket members 2,2', respectively, is mounted on the external peripheral surface of the sidewall of said tank. Reference numeral 3 denotes a bottom cooling jacket which is installed between the bottom wall of said tank and the foundation thereof and is mounted directly underneath the bottom surface of the tank. The upper jacket member 2 has a horizontal header 4 at the upper end thereof and a horizontal header 4' at the lower end thereof. Within the jacket member 2 there are provided passages which communicate with and extend vertically between the upper and lower headers. The upper header and the lower header are provided with partitions 5 and 5' so that the coolant flows in the directions indicated by the arrows in FIG. 1, that is, the coolant flows through alternate upwardly directed and downwardly directed flow paths. The lower jacket member 2' is of the same structure as that of the upper jacket member 2, wherein 4a and 4a' denote the upper and lower headers, respectively. The lower header 4' of the upper jacket 2 is connected by a pipe 2a to the discharge end of the upper header 4a of the lower jacket 2'. A coolant supply pipe 7 is connected to the end of the upper header 4a of the lower jacket 2' at the end thereof remote from the pipe 2a. A coolant discharge pipe 7' is installed on the end of the lower header 4' of the upper jacket 2 at the end thereof remote from the pipe 2a. As is obvious from this coolant piping arrangement, the coolant, such as brine, is fed into the upper header 4a of the lower jacket member 2', passes through the interior thereof, then passes through the upper jacket member 2 and is discharged from the lower header of the upper jacket member 2. As to the bottom jacket 3, brine is fed therein by the pipe 7a which is branched from the supply pipe 7, and it circulates in the direction of the arrows as illustrated in FIG. 2, and is thereafter discharged through the pipe 7'.

Since the coolant having a low temperature is first flowed through the lower jacket member 2' and thence through the upper jacket member 2 mounted on the body of the tank as described above, the beer in the lower portion of the tank will be cooled more intensively than the beer in the upper portion of the tank because the temperature of the coolant is lower and a greater temperature difference exists between the coolant and the beer in the lower portion of the tank. As the beer is cooled, when it reaches a temperature at which its density is highest, which temperature is slightly less than about 4° C., beer at such temperature will tend to descend in said tank whereas beer of lower or higher temperature will tend to rise in the tank, relative to the beer which is at such temperature at which its density is highest. Thus, there will be a continuous, though very gentle, circulation of beer in the tank even though the beer is not mechanically agitated. Circulation of cooler beer toward the upper end of the tank will continue even after all the beer has been cooled to or below a temperature corresponding to its highest density, because of density differences. That is, beer at 0° C. has a lower density than beer at 2° C., for example. Thus, by cooling the beer more intensively in the lower portion of the tank, continuous circulation of the beer during cooling is assured, thereby achieving high cooling efficiency. In this way the entirety of the beer can be cooled to a substantially uniform temperature close to, but slightly above, its freezing point. By cooling the beer in the lower portion of the tank more intensively, continuous circulation of the beer is assured and the creation of stagnant zones, wherein the beer does not move, is avoided in the tank.

In addition to the overall temperature gradient of the coolant in the vertical direction in the tank, there will also exist a small horizontal temperature gradient between the horizontal ends of each of the cooling jacket members 2,2' as well as a small vertical temperature gradient in each tube in the cooling jacket members. Although the horizontal temperature gradient across the jackets and the vertical temperature gradient along the tubes of each jacket member will be less significant than the overall vertical temperature gradient of the coolant in the tank, nonetheless they will contribute to the overall circulation of beer within the tank. This circulation will make it more easy to cool the entirety of the beer in the tank to below the temperature at which the beer has its greatest density, which is somewhat below 4° C. This circulation is the result of the special flow path of the coolant as described above, according to the invention. Moreover, because the bottom jacket 3 is insulated by means of polyurethane foam which is superior in compressive strength, it is possible to effect better cooling by means of a jacket provided underneath the bottom surface of the tank, in comparison with a tank installed on the foundation with the conventional insulating materials which are quite vulnerable to compressive force. Accordingly, the product beer can be free from the yeasty off-flavor or the autolysed yeast off-flavor due to self-digestion of yeast containing dead cells that accumulate on the bottom of the tank during fermentation.

The provision of penetrating holes 8 on the upper end of the partitions 5 which subdivide the upper headers 4,4' of the jackets 2,2', as illustrated in FIG. 3 and FIG. 4, is effective for accelerating the rapid cooling of beer.

Drawing out of coolant from the jacket can be performed by opening a cock 4b disposed in the lower part of the lower header 4a'.

Further, the provision of an air trapping pipe 9 which extends above both ends of the upper header 4 of the upper jacket member 2, as illustrated in FIG. 1 and FIG. 5, makes it possible to remove air which is entrained in the coolant. This air removal enhances the effective heat transmission area of the jacket. Besides, though not shown in the drawings, provision of a head tank for coolant disposed higher than the upper head 4 and in the vicinity of the pump suction side of the return-pipe for coolant further facilitates the removal of air within the jacket by way of the air trapping pipe 9.

The embodiments of the invention in which an exclusive property or privilege is claimed are defined as follows:

1. A method of cooling beer contained in an upright cylindrical fermentation tank having a capacity of more than 200 kiloliters and having a height of 10 meters or more and wherein the tank is filled with beer, which beer undergoes a fermentation process extending from the beginning of fermentation to the end of fermentation while it is contained in the tank, which comprises the steps of: flowing a stream of fluid coolant into a first horizontal header located at the upper end of an upright lower stage cooling jacket, which jacket is mounted on the lower portion of the exterior of the upright sidewall of said fermentation tank, thence flowing said coolant downwardly through downflow conduit means to a second horizontal header located at the lower end of said lower stage cooling jacket and thence flowing said coolant upwardly through upflow conduit means to said first header, said coolant being alternately flowed in series downwardly and upwardly through downflow conduit means and upflow conduit means, respectively, between said first and second headers as it passes through said lower stage cooling jacket, discharging said coolant from said first header of said lower stage cooling jacket and flowing it into a third horizontal header located at the lower end of an upright upper stage cooling jacket, which jacket is mounted on the upper portion of the exterior of the upright sidewall of said fermentation tank, thence flowing said coolant upwardly through upper stage upflow conduit means to a fourth horizontal header located at the upper end of said upper stage cooling jacket, said fourth horizontal header having air trapping pipe means projecting upwardly from the upper end thereof, and thence flowing said coolant downwardly through upper stage downflow conduit means to said third header, said coolant being alternately flowed in series upwardly and downwardly through upper stage upflow conduit means and upper stage downflow conduit means, respectively, between said third and fourth headers as it passes through said upper stage cooling jacket portion, removing entrained air from the coolant through said air trapping pipe means, and discharging said coolant from said third header; and simultaneously flowing a separate stream of said fluid coolant through a bottom wall cooling jacket located underneath the bottom wall of said tank; the flows of said coolant being effective to cool the beer by indirect heat exchange therewith and the beer in the lower portion of said tank being subjected to more intensive cooling due to the temperature of the coolant being lower when it flows through said lower stage cooling jacket and said bottom wall cooling jacket, the flows of the coolant being effective to reduce the temperature of the beer to about 0° C. and circulation of the beer in said tank being effected because beer cooled below about 4° C. rises in the tank while beer at slightly less than about 4° C. descends in the tank because of its higher density.

2. A method according to claim 1 in which said headers have partitions therein whereby to cause the coolant to flow through said conduit means, said partitions having holes penetrating therethrough at the upper ends thereof, and including the step of flowing a small quantity of the coolant directly through the partitions.

* * * * *